(12) United States Patent
De Palo et al.

(10) Patent No.: US 7,572,860 B2
(45) Date of Patent: *Aug. 11, 2009

(54) POLYOLEFIN ARTICLES

(75) Inventors: Roberto De Palo, Ferrara (IT); Paola Massari, Ferrara (IT); Camillo Cagnani, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 424 days.

This patent is subject to a terminal disclaimer.

(21) Appl. No.: 10/567,192

(22) PCT Filed: Jul. 22, 2004

(86) PCT No.: PCT/EP2004/008252

§ 371 (c)(1),
(2), (4) Date: Feb. 3, 2006

(87) PCT Pub. No.: WO2005/014713

PCT Pub. Date: Feb. 17, 2005

(65) Prior Publication Data

US 2007/0117932 A1  May 24, 2007

Related U.S. Application Data

(60) Provisional application No. 60/497,830, filed on Aug. 26, 2003.

(30) Foreign Application Priority Data

Aug. 5, 2003 (EP) .................................. 03017824

(51) Int. Cl.
C08L 23/00 (2006.01)
C08L 23/04 (2006.01)
C08L 23/10 (2006.01)
C08L 23/16 (2006.01)
C08L 9/00 (2006.01)

(52) U.S. Cl. .................... 525/191; 525/232; 525/240

(58) Field of Classification Search ............... 525/191, 525/232, 240
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 5,145,819 A | 9/1992 | Winter et al. | 502/117 |
| 5,324,800 A | 6/1994 | Welborn, Jr. et al. | 526/160 |
| 6,127,304 A | 10/2000 | Sacchetti et al. | |
| 6,300,420 B1 | 10/2001 | Jääskeläinen et al. | 525/240 |
| 6,323,152 B1 | 11/2001 | Sacchetti et al. | |
| 6,407,028 B1 | 6/2002 | Sacchetti et al. | |
| 6,433,087 B1 | 8/2002 | Ebner et al. | 525/191 |
| 6,437,061 B1 | 8/2002 | Sacchetti et al. | |
| 6,461,703 B1 | 10/2002 | Rigosi | |
| 6,503,993 B1 | 1/2003 | Huovinen et al. | 526/348.1 |
| 6,686,307 B2 | 2/2004 | Sacchetti et al. | |
| 6,689,845 B1 | 2/2004 | Govoni et al. | |
| 6,818,187 B2 | 11/2004 | Govoni et al. | |
| 6,825,309 B2 | 11/2004 | Morini et al. | |
| 7,169,871 B2 | 1/2007 | Morini et al. | |
| 2002/0035210 A1 | 3/2002 | Silvestri et al. | 525/240 |
| 2007/0265398 A1* | 11/2007 | de Palo et al. | 525/416 |
| 2008/0071032 A1* | 3/2008 | Massari et al. | 525/240 |
| 2008/0167428 A1* | 7/2008 | Massari et al. | 525/240 |

FOREIGN PATENT DOCUMENTS

| | | |
|---|---|---|
| EP | 0045977 | 2/1982 |
| EP | 0129368 | 12/1984 |
| EP | 0361493 | 4/1990 |
| EP | 0373660 | 6/1990 |
| EP | 0395083 | 10/1990 |
| EP | 0416815 | 3/1991 |
| EP | 0420436 | 4/1991 |
| EP | 0485823 | 5/1992 |
| EP | 0643066 | 3/1995 |
| EP | 0671404 | 9/1995 |
| EP | 0728769 | 8/1996 |
| EP | 0782587 | 7/1997 |
| EP | 1272533 | 9/2001 |
| EP | 1260546 | 11/2002 |
| EP | 1493377 | 1/2005 |
| EP | 1632529 | 3/2006 |
| FR | 2834326 | 7/2003 |
| GB | 1439370 | 6/1976 |
| GB | 1499863 | 2/1978 |
| WO | 9104257 | 4/1991 |
| WO | 98/44009 | 10/1998 |
| WO | 99/21916 | 5/1999 |
| WO | 00/02929 | 1/2000 |
| WO | 0063261 | 10/2000 |
| WO | 02/30998 | 4/2002 |
| WO | 0238670 | 5/2002 |
| WO | 2006/114358 | 11/2006 |

* cited by examiner

*Primary Examiner*—Nathan M Nutter
(74) *Attorney, Agent, or Firm*—William R. Reid

(57) ABSTRACT

Articles, in particular non-pressure mono- or multi-layer pipes, prepared by extrusion, molding and combination thereof, comprising a heterophasic polyolefin composition comprising (1) 65-95% of a crystalline propylene polymer insoluble in xylene at ambient temperature in an amount over 85% and having a polydispersity index ranging from 4 to 13 and an intrinsic viscosity value ($[\eta]_1$) of over 2.2 dl/g, and (2) 5-35% of an elastomeric olefin polymer of ethylene with a $C_3$-$C_{10}$ α-olefin having an ethylene content ranging from 15 to 85% and an intrinsic viscosity value ($[\eta]_2$) of at least 1.4 g/ml. The $[\eta]_1/[\eta]_2$ ratio ranging from 0.45 to 1.6. The articles typically have modulus of elasticity in tension higher than 2000 MPa.

The invention also relates to the said heterophasic polyolefin composition and an extrusion process for producing the said articles.

10 Claims, No Drawings

POLYOLEFIN ARTICLES

This application is the U.S. national phase of International Application PCT/EP2004/008252, filed Jul. 22, 2004, claiming priority to European Patent Application 03017824.8 filed Aug. 5, 2003, and the benefit under 35 U.S.C. 119(e) of U.S. Provisional Application No. 60/497,830, filed Aug. 26, 2003; the disclosures of International Application PCT/EP2004/008252, European Patent Application 03017824.8 and U.S. Provisional Application No. 60/497,830, each as filed, are incorporated herein by reference.

The present invention relates to stiffness articles prepared by extrusion, moulding and combination thereof, such as pipe moulding, sheet moulding, film moulding, profile extrusion, or blow moulding. More particularly, the present invention is concerned with mono- or multi-layer pipes, fittings and laminated articles having a good balance of mechanical properties. The invention further concerns a polyolefin composition that is particularly suitable for the manufacture of said moulding articles. The polyolefin composition provides pipes with remarkably higher stiffness and strength than standard heterophasic polymer compositions and improved or retained impact properties.

The pipes according to the present invention are particularly suitable for non-pressure pipe applications, such as waste water pipes, for both indoor use and, preferably, outdoor use. In particular, due to the property of high stiffness, the said pipes can find use as underground drain pipes and buried sewage pipes.

It is also known that most propylene polymers suitable for pipes do not have good processability.

U.S. Pat. No. 6,300,420 describes that such a drawback may be overcome by a reactor blend composition with broad molecular weight distribution. The composition consists of two copolymer matrices with different molecular weight and content of comonomer (ethylene) and more homogenous distribution of the comonomer in the copolymer. Such propylene random copolymers are particularly suitable for pressure pipe applications and therefore do not have that balance of properties required for non-pressure applications, such as high enough values of resistance to stretch.

Non-pressure pipes made from propylene polymers and having high stiffness and strength as well as other desired properties are already known. Several solutions have been proposed in the prior art to obtain such properties. For example, propylene polymers are nucleated with particular nucleated agents, such as disclosed in EP patent application No. 1260546 and U.S. Pat. No. 6,503,993.

The same results can be achieved by using a particular polymer composition, as disclosed in U.S. Pat. No. 6,433,087. The composition comprises 80-98 parts by weight of a high crystalline isotactic polypropylene homopolymer and 2 to 20 parts by weight of an elastomeric copolymer of propylene with 30-50 parts by weight of ethylene and/or a $C_4$-$C_{10}$ α-olefin. The intrinsic viscosity ratio of the elastomeric polymer to the crystalline polymer is 0.9 to 1.5. The pipes exhibit high values of stiffness and modulus of elasticity in tension. The examples show that the highest value of ring stiffness achieved is 6.8 kN/m$^2$; the said value is determined on pipes with external diameter of 110 mm and wall thickness of 3.7 mm. The value of modulus of elasticity in tension calculated on a pipe with the said dimensions and ring stiffness is 1935 MPa, such value is calculated by means of the formula according to German method AT 127 and recited hereinbelow.

It is an aim of the present invention to provide polyolefin pipes that have improved resistance properties, in particular better resistance to stretch and impact resistance at low temperature, without decreasing stiffness. It is further aim to improve processability of polymer compositions for pipes.

It has now surprisingly been found that moulding articles with high strength (namely tension modulus) as well as high stiffness and good impact resistance at low temperatures can be obtained by using a heterophasic polyolefin composition, which is a further embodiment of the present invention, comprising an elastomeric polymer along with a crystalline polymer having a broad molecular weight distribution and wherein the polymers have a quite high molecular weight.

An advantageous feature of the present invention is that pipes have thinner walls than walls of prior art pipes without reducing the strength performance of pipes, for example. Consequently, comparing pipes with the same length, it will be used less polymer material than polymer material previously used for prior art pipes. In addition, moulding process will require shortened cooling time. As a result of lower pipe weight and shorter cooling time, the economic efficiency will be affected positively.

Because of higher flowability of the polymer composition used, the articles according to the present invention also possess more homogeneous thickness.

In addition, processability by extrusion of the articles according to the present invention is improved by the higher flowability of the polymer compositions used than that of conventional propylene polymers having the same or even higher melt flow rate. As a result, the extrusion process according to the present invention requires a lower pressure or extrusion temperature in the die and, consequently, both less energy for carrying out the process and shorter time to cool the extruded articles are required. The efficiency of the process is thus improved.

The present invention therefore provides articles prepared by extrusion, moulding and combination thereof, said articles being produced by a heterophasic polyolefin composition comprising (percent by weight):
1) 65-95% of a crystalline propylene polymer selected from propylene homopolymer and random polymer of propylene with 0.1-10% of an α-olefin selected from ethylene, a $C_4$-$C_{10}$ α-olefin and a mixture thereof, the said polymer being insoluble in xylene at ambient temperature in an amount over 85% and having a polydispersity index ranging from 4 to 13, preferably 4.5 to 12, more preferably 5 to 9, and an intrinsic viscosity value over 2.2 dl/g, preferably 2.2 to 4.5 dl/g; and
2) 5-35% of an elastomeric olefin polymer of ethylene with a $C_3$-$C_{10}$ α-olefin and optionally a diene, having an ethylene content ranging from 15 to 85% and an intrinsic viscosity ([η]) value of at least 1.4 g/ml, preferably from 2.5 to 5 g/ml.

The ratio of the intrinsic viscosity value of crystalline polymer (1) to that of elastomeric polymer (2) ranges from 0.45 to 1.6.

The term "polymer" as used herein also refers to polymers prepared by the polymerization of at least two different types of monomers. The generic term "polymer" thus includes the term "copolymers" (which is usually employed to refer to polymers prepared from two different monomers) as well as the term "terpolymers" (which is usually employed to refer to polymers prepared from three different types of monomers, e.g., an propylene-ethylene-butene polymer).

Another embodiment of the present invention is a heterophasic composition as recited in present claim 7.

In one preferred embodiment of the invention, the heterophasic composition further comprises an inorganic filler agent in an amount ranging from 0.5 to 60 parts by weight with respect to 100 parts by weight of the said heterophasic polyolefin composition. Few examples of such filler agents are calcium carbonate, barium sulphate, titanium bioxide and talc. Talc and calcium carbonate are preferred. A number of filler agents can also have a nucleating effect, such as talc that is also a nucleating agent. The amount of a nucleating agent is typically from 0.5 to 5 wt % with respect to the polymer amount.

The stereoregularity of the said crystalline polymers is preferably of the isotactic type.

Preferably, in the said polyolefin composition the crystalline polymer is isotactic propylene homopolymer.

The crystalline polymers are preferably insoluble in xylene at ambient temperature in an amount over 90%, more preferably over 95%.

When the crystalline propylene polymer is a copolymer of propylene with a $C_4$-$C_{10}$ α-olefin, typically the $C_4$-$C_{10}$ α-olefin content ranges from 0.1 to less 2 wt %.

When the crystalline propylene polymer is a terpolymer of propylene with ethylene and a $C_4$-$C_{10}$ α-olefin, typically the ethylene and $C_4$-$C_{10}$ α-olefin content ranges from 0.5 to less than 2%.

When the comonomer is a $C_4$-$C_{10}$ α-olefin in the crystalline and elastomeric polymer, it is linear or branched and is preferably selected from butene-1, pentene-1,4-methylpentene-1, hexene-1 and octene-1, or combinations thereof.

The elastomeric polymer may contain a diene, conjugated or not, such as butadiene, 1,4-hexadiene, 1,5-hexadiene and ethylidene-norbornene-1. The diene, when present, is typically in an amount of from 0.5 to 10% by weight with respect to the weight of the elastomeric polymer.

The elastomeric polymer typically has an ethylene content ranging from 20 to 80 wt %, preferably from 35 to 60 wt %.

The said polymer composition has generally a melt flow rate value of from 0.01 to 100 g/10 min.

Preferably, the above heterophasic composition exhibits a flexural modulus value of 1600 MPa or higher and/or an Izod impact resistance value at −20° C. of 5 kJ/m$^2$ or higher, preferably 6 kJ/m$^2$ or higher, and/or a value of tensile strength at yield of 29 MPa or higher, preferably 30 MPa or higher. Preferably, the heterophasic composition has modulus of elasticity in tension of at least 1600 MPa.

A preferred embodiment of the present invention relates to articles for non-pressure pipe systems, such as non-pressure pipes and fittings, made from the above mentioned heterophasic polyolefin composition that typically have a melt flow rate value up to 2 g/10 min. In particular, the present invention provides polyolefin-based mono- or multi-layer pipes, wherein at least one layer comprises the above mentioned heterophasic polyolefin composition having a melt flow rate value up to 2 g/10 min.

Typically, the articles according to the present invention have modulus of elasticity in tension higher than 2000 MPa, preferably 2100 MPa or higher, such as from 2100 to 2400 MPa, determined according to the method reported hereinbelow.

In particular, the invented solid wall pipes with smooth inner and outer surface and with an external diameter of ≧20 mm to ≦2000 mm pipes have values of ring stiffness (SN) that satisfy the following mathematical relationship $$270 \text{ kN/m}^2 \times [10/(SDR-1)]^3 \geq SN \geq 130 \text{ kN/m}^2 \times [10/(SDR-1)]^3,$$

preferably for the numerical values 260 and 135 kN/m$^2$ (instead of 270 and 130 kN/m$^2$), where SDR represents the ratio of the external diameter to the wall thickness.

For example, in the case of a pipe with an external diameter of 250 mm and wall thickness of 10.7 mm, this means that the ring stiffness, measured as disclosed hereinbelow, has a value approximately of from 11.6 to 24.1 kN/m$^2$, preferably 12.1 to 23.7 kN/m$^2$.

The above composition is also suitable for providing rigid polypropylene pipes with walls of any configuration other than those with smooth inner and outer surface. Examples are pipes with a sandwich-like pipe wall, pipes with a hollow wall construction with longitudinally extending cavities, pipes with a hollow wall construction with spiral cavities pipes with a smooth inner surface and a compact or hollow, spirally shaped, or an annularly ribbed outer surface, independently of the configuration of the respective pipe ends.

The heterophasic polyolefin composition may be prepared in accordance with the well-known polymerization processes.

The process for preparing the previously said heterophasic composition is carried out by a sequential polymerization comprising at least two sequential steps, wherein components (1) and (2) are prepared in separate subsequent steps, operating in each step, except the first step, in the presence of the polymer formed and the catalyst used in the preceding step. The catalyst is added only in the first step, however its activity is such that it is still active for all the subsequent steps. Component (1) is preferably prepared in a single polymerization stage. The order of the polymerization stages is not a critical process feature, however component (1) is preferably prepared before component (2).

The polymerisation can occur in liquid phase, gas phase or liquid-gas phase.

For example, it is possible to carry out the propylene polymerisation stage using liquid propylene as diluent, and the following copolymerisation stage in gas phase, without intermediate stages except for the partial degassing of the propylene.

Examples of suitable reactors are continuously operated stirred reactors, loop reactors, fluidized-bed reactors or horizontally or vertically stirred powder bed reactors. Of course, the reaction can also be carried out in a plurality of reactors connected in series.

It is possible to carry out the polymerisation in a cascade of stirred gas-phase reactors that are connected in series and in which the pulverulent reaction bed is kept in motion by means of a vertical stirrer. The reaction bed generally comprises the polymer that is polymerised in the respective reactor.

Propylene polymerisation to form component (1) can be done in the presence of ethylene and/or one or more $C_4$-$C_{10}$ α-olefin(s), such as for example butene-1, pentene-1,4-methylpentene-1, hexene-1 and octene-1, or combinations thereof.

As previously said, the copolymerisation of ethylene with propylene (preferred) and/or other $C_4$-$C_{10}$ α-olefin(s) to form component (2) can occur in the presence of an above-mentioned diene.

Reaction time, pressure and temperature relative to the polymerisation steps are not critical, however it is best if the temperature is from 20 to 150° C., in particular from 50 to 100° C. The pressure can be atmospheric or higher.

The regulation of the molecular weight is carried out by using known regulators, hydrogen in particular.

Alternatively, the heterophasic polyolefin composition used for preparing the pipes according to the present invention may be produced by a gas-phase polymerisation process carried out in at least two interconnected polymerisation zones. The said type of process is illustrated in EP application No. 782 587.

In detail, the said process comprises feeding one or more monomer(s) to said polymerisation zones in the presence of catalyst under reaction conditions and collecting the polymer product from the said polymerisation zones. In said process the growing polymer particles flow upward through one (first) of the said polymerisation zones (riser) under fast fluidisation conditions, leave said riser and enter another (second) polymerisation zone (downcomer) through which they flow downward in a densified form under the action of gravity, leave said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it becomes to possible to reintroduce the polymer into the riser without the help of special mechanical means. In this way, a "loop" circulation is set up, which is defined by the balance of pressures between the two polymerisation zones and by the head loss introduced into the system.

Generally, the condition of fast fluidization in the riser is established by feeding a gas mixture comprising the relevant monomers to the said riser. It is preferable that the feeding of the gas mixture is effected below the point of reintroduction of the polymer into the said riser by the use, where appropriate, of gas distributor means. The velocity of transport gas into the riser is higher than the transport velocity under the operating conditions, and is preferably from 2 to 15 m/s.

Generally, the polymer and the gaseous mixture leaving the riser are conveyed to a solid/gas separation zone. The solid/gas separation can be effected by using conventional separation means. From the separation zone, the polymer enters the downcomer. The gaseous mixture leaving the separation zone is compressed, cooled and transferred, if appropriate with the addition of make-up monomers and/or molecular weight regulators, to the riser. The transfer can be effected by means of a recycle line for the gaseous mixture.

The control of the polymer circulating between the two polymerisation zones can be effected by metering the amount of polymer leaving the downcomer using means suitable for controlling the flow of solids, such as mechanical valves.

The operating parameters, such as the temperature, are those that are usual in gas-phase olefin polymerisation process, for example between 50 and 120° C.

The operating pressure can range between 0.5 and 10 MPa, preferably between 1.5 to 6 MPa.

Advantageously, at least one inert gas is maintained in the polymerisation zones, in such quantities that the sum of the partial pressures of the inert gases is preferably between 5 and 80% of the total pressure of the gas. The inert gas can be nitrogen or propane, for example.

Preferably, the various catalyst components are fed to the riser at any point of the said riser. However, they can also be fed at any point of the downcomer. The catalyst can be in any physical state, therefore catalysts in either solid or liquid state can be used.

The preferred catalysts to be used in the present polymerization process are Ziegler-Natta catalysts comprising a solid catalyst component including a titanium compound having at least one titanium-halogen bond, and an electron-donor compound, both supported on a magnesium halide in active form as preferred support, optionally with silica as co-support.

Catalysts having the above mentioned characteristics are well known in the patent literature; particularly advantageous are the solid catalyst components used in the catalysts described in U.S. Pat. No. 4,399,054, European patents Nos. 45977 and 395083.

The solid catalyst components used in the said catalysts comprise, as electron-donor compounds (internal electron-donor compounds), compounds selected from the group consisting of ethers, ketones, lactones, compounds containing N, P and/or S atoms, and esters of mono- and dicarboxylic acids. Particularly suitable electron-donor compounds are phthalic acid esters, such as diisobutyl, dioctyl, diphenyl and benzylbutyl phthalate, and esters of succinic acids.

Particularly suitable internal electron donor compounds are selected from succinates disclosed in international patent application WO 00/63261. Preferably, succinates have formula (I) below:

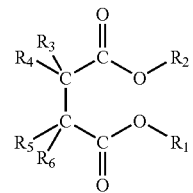

wherein the radicals $R_1$ and $R_2$ radicals, equal to, or different from, each other are a $C_1$-$C_{20}$ linear or branched alkyl, alkenyl, cycloalkyl, aryl, arylalkyl or alkylaryl radical group, optionally containing heteroatoms; the $R_3$ to $R_6$ radicals equal to, or different from, each other, are hydrogen or a $C_1$-$C_{20}$ linear or branched alkyl, alkenyl, cycloalkyl, aryl, arylalkyl or alkylaryl radical group, optionally containing heteroatoms, and the $R_3$ to $R_6$ radicals which are joined to the same carbon atom can be linked together to form a cycle; with the proviso that when $R_3$ to $R_5$ radicals are contemporaneously hydrogen, $R_6$ is a radical selected from primary branched, secondary or tertiary alkyl, cycloalkyl, aryl, arylalkyl or alkylaryl radical groups having from 3 to 20 carbon atoms, or a linear alkyl radical group having at least four carbon atoms optionally containing heteroatoms.

$R_1$ and $R_2$ are preferably $C_1$-$C_8$ alkyl, cycloalkyl, aryl, arylalkyl and alkylaryl radical groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, nbutyl, isobutyl, neopentyl, 2-ethylhexyl. Particularly preferred are ethyl, isobutyl, and neopentyl.

One of the preferred groups of compounds described by formula (I) is that in which $R_3$ to $R_5$ radicals are hydrogen and $R_6$ is a branched alkyl, cycloalkyl, aryl, arylalkyl and alkylaryl radical having from 3 to 10 carbon atoms. Particularly preferred are the compounds in which $R_6$ is a branched primary alkyl group or a cycloalkyl group having from 3 to 10 carbon atoms. Specific examples are disclosed in the above-mentioned patent application.

Furthermore, also the compounds in which at least two radicals different from hydrogen are linked to different carbon atoms, that is $R_3$ and $R_5$ or $R_4$ and $R_6$ are particularly preferred. Preferred examples of such succinates to be used in the above said catalyst components are diethyl 2,3-bis(trimethylsilyl)succinate, diethyl 2,2-sec-butyl-3-methylsuccinate, diethyl 2-(3,3,3-trifluoropropyl)-3-methylsuccinate, diethyl 2,3-bis(2-ethylbutyl)succinate, diethyl 2,3-diethyl-2-isopropylsuccinate, diethyl 2,3-diisopropyl-2-methylsuccinate, diethyl 2,3-dicyclohexyl-2-methylsuccinate, diethyl 2,3-dibenzylsuccinate, diethyl 2,3-diisopropylsuccinate, diethyl 2,3-bis(cyclohexylmethyl)succinate, diethyl 2,3-di-t-butylsuccinate, diethyl 2,3-diisobutylsuccinate, diethyl 2,3-dineopentylsuccinate, diethyl 2,3-diisopentylsuccinate, diethyl 2,3-(1-trifluoromethyl-ethyl)succinate, diethyl 2,3-(9-fluorenyl)succinate, diethyl 2-isopropyl-3-isobutylsuccinate, diethyl 2-t-butyl-3-isopropylsuccinate, diethyl 2-isopropyl-3-cyclohexylsuccinate, diethyl 2-isopentyl-3-cyclohexylsuccinate, diethyl 2-cyclohexyl-3-cyclopentylsuccinate, diethyl 2,2,3,3-tetramethylsuccinate, diethyl 2,2,3,3-tetraethylsuccinate, diethyl 2,2,3,3-tetrapropylsuccinate, diethyl 2,3-diethyl-2,3-diisopropylsuccinate, diisobutyl 2,3 bis(trimethylsilyl)succinate, diisobutyl 2,2-sec-butyl-3-methylsuccinate, diisobutyl 2-(3,3,3-trifluoropropyl)-3-methylsuccinate, diisobutyl 2,3-bis(2-ethylbutyl)succinate, diisobutyl 2,3-diethyl-2-isopropylsuccinate, diisobutyl 2,3-diisopropyl-2-methylsuccinate, diisobutyl 2,3-dicyclohexyl-2-methylsuccinate, diisobutyl 2,3-dibenzylsuccinate, diisobutyl 2,3-diisopropylsuccinate, diisobutyl 2,3-bis(cyclohexylmethyl)succinate, diisobutyl 2,3-di-t-butylsuccinate, diisobutyl 2,3-diisobutylsuccinate, diisobutyl 2,3-dineopentylsuccinate, diisobutyl 2,3-diisopentylsuccinate, diisobutyl 2,3-(1,1,1-trifluoro-2-propyl)succinate, diisobutyl 2,3-n-propylsuccinate, diisobutyl 2,3-(9-fluorenyl)succinate, diisobutyl 2-isopropyl-3-ibutylsuccinate, diisobutyl 2-terbutyl-3-ipropylsuccinate, diisobutyl 2-isopropyl-3-cyclohexylsuccinate, diisobutyl 2-isopentyl-3-cyclohexylsuccinate, diisobutyl 2-n-propyl-3-(cyclohexylmethyl)succinate, diisobutyl 2-cyclohexyl-3-cyclopentylsuccinate, diisobutyl 2,2,3,3-tetramethylsuccinate, diisobutyl 2,2,3,3-tetraethylsuccinate, diisobutyl 2,2,3,3-tetrapropylsuccinate, diisobutyl 2,3-diethyl-2,3-diisopropylsuccinate, dineopentyl 2,3-bis(trimethylsilyl)succinate, dineopentyl 2,2-di-sec-butyl-3-methylsuccinate, dineopentyl 2-(3,3,3-trifluoropropyl)-3-methylsuccinate, dineopentyl 2,3 bis(2-ethylbutyl)succinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-di-t-butylsuccinate, dineopentyl 2,3-diisobutylsuccinate, dineopentyl 2,3-dineopentylsuccinate, dineopentyl 2,3-diisopentylsuccinate, dineopentyl 2,3-(1,1,1-trifluoro-2-propyl)succinate, dineopentyl 2,3-n-propylsuccinate, dineopentyl 2,3(9-fluorenyl)succinate, dineopentyl 2-isopropyl-3-isobutylsuccinate, dineopentyl 2-t-butyl-3-isopropylsuccinate, dineopentyl 2-isopropyl-3-cyclohexylsuccinate, dineopentyl 2-isopentyl-3-cyclohexylsuccinate, dineopentyl 2-n-propyl-3-(cyclohexylmethyl)succinate, dineopentyl 2-cyclohexyl-3-cyclopentylsuccinate, dineopentyl 2,2,3,3-tetramethylsuccinate, dineopentyl 2,2,3,3-tetraethylsuccinate, dineopentyl 2,2,3,3-tetrapropylsuccinate, dineopentyl 2,3-diethyl-2,3-diisopropylsuccinate.

Particularly preferred are diethyl 2,3-dibenzylsuccinate, diethyl 2,3-diisopropylsuccinate, diethyl 2,3-bis(cyclohexylmethyl)succinate, diethyl 2,3-diisobutylsuccinate, diethyl 2,3-(1-trifluoromethyl-ethyl)succinate, diisobutyl 2,3-dibenzylsuccinate, diisobutyl 2,3-diisopropylsuccinate, diisobutyl 2,3-bis(cyclohexylmethyl)succinate, diisobutyl 2,3-n-propylsuccinate, dineopentyl 2,3-diethyl-2-isopropylsuccinate, dineopentyl 2,3-diisopropyl-2-methylsuccinate, dineopentyl 2,3-dicyclohexyl-2-methylsuccinate, dineopentyl 2,3-dibenzylsuccinate, dineopentyl 2,3-diisopropylsuccinate, dineopentyl 2,3-bis(cyclohexylmethyl)succinate, dineopentyl 2,3-diisobutylsuccinate, dineopentyl 2,3-n-propylsuccinate, dineopentyl 2-isopropyl-3-cyclohexylsuccinate.

Other electron-donors particularly suitable are 1,3-diethers of formula:

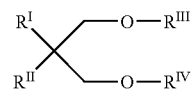

wherein $R^I$ and $R^{II}$ radicals are the same or different and are $C_1$-$C_{18}$ alkyl, $C_3$-$C_{18}$ cycloalkyl or $C_7$-$C_{18}$ aryl radicals; $R^{III}$ and $R^{IV}$ radicals are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in published European patent applications Nos 361493 and 728769.

Representative examples of said diethers are as follows: 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane and 9,9-bis (methoxymethyl)fluorene.

The preparation of the above mentioned catalyst components is carried out according to various methods. For example, a $MgCl_2 \cdot nROH$ adduct (in particular in the form of spherical particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared. In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide. The titanium compounds, which can be used for the preparation of the solid catalyst component, are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Ziegler-Natta catalysts also comprise a co-catalyst, i.e. an organoaluminum compound, such as an aluminum alkyl compound. An external donor is optionally added to the organoaluminium compound.

The Al-alkyl compounds used as co-catalysts comprise the Al-trialkyls, such as Al-triethyl, Al-triisobutyl, Al-tributyl, and linear or cyclic Al-alkyl compounds containing two or more Al atoms bonded to each other by way of O or N atoms, or $SO_4$ or $SO_3$ groups.

The Al-alkyl compound is generally used in such a quantity that the Al/Ti ratio be from 1 to 1000.

The electron-donor compounds that can be used as external donors include aromatic acid esters such as alkyl benzoates and in particular silicon compounds containing at least one Si—OR bond, where R is a hydrocarbon radical. Useful examples of silicon compounds are (tert-butyl)$_2$Si(OCH$_3$)$_2$, (cyclopentyl)$_2$Si(OCH$_3$)$_2$, (cyclohexyl) (methyl)Si(OCH$_3$)$_2$ and (phenyl)$_2$Si(OCH$_3$)$_2$.

1,3-diethers having the formulae described above can also be used advantageously.

If the internal donor is one of these diethers, the external donors can be omitted.

Prior to the polymerisation process, the catalysts can be precontacted with small quantities of olefins (prepolymerisation), thus improving both the performance of the catalysts and the morphology of the polymers. Prepolymerisation is carried out maintaining the catalysts in suspension in a hydrocarbon solvent (hexane or heptane, for example) and polymerising at a temperature from ambient to 60° C. for a time sufficient to produce quantities of polymer from 0.5 to 3 times the weight of the solid catalyst component. It can also be carried out in liquid propylene, at the temperature conditions indicated above, producing quantities of polymer that can reach up to 1000 g per g of catalyst component.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts is the so-called constrained geometry catalysts, as described in EP-A-0 416 815, EP-A-0 420 436, EP-A-0 671 404, EP-A-0 643 066 and WO 91/04257.

Pipes, fittings, profiles, films and sheets according to the present invention are produced in manner known per se by (co-)extrusion or moulding, respectively, for instance.

Extrusion of articles can be made with different type of extruders for polyolefin, e.g. single or twin screw extruders.

A further embodiment of the present invention is a process wherein the said heterophasic polymer composition is moulded into said articles.

Due to high flowability of the polymer composition used the extrusion process requires lower pressure or temperatures in the die than that required when conventional olefin polymers are used even if they have higher melt flow rate. For example, the value of pressure can be reduced of about 10%.

When the pipes are multi-layer, at least one layer is made of the propylene polymer composition described above. The further layer(s) is/are preferably made of an amorphous or crystalline polymer (such as homopolymer and co- or terpolymer) of R—CH=CH$_2$ olefins, where R is a hydrogen atom or a C$_1$-C$_6$ alkyl radical. Particularly preferred are the following polymers:
1) isotactic or mainly isotactic propylene homopolymers;
2) random co- and terpolymers of propylene with ethylene and/or C$_4$-C$_8$ α-olefin, such as 1-butene, 1-hexene, 1-octene, 4-methyl-1-pentene, wherein the total comonomer content ranges from 0.05% to 20% by weight, or mixture of said polymers with isotactic or mainly isotactic propylene homopolymers;
3) heterophasic polymer blends comprising (a) a propylene homopolymer and/or one of the co- and terpolymers of item (2), and an elastomeric moiety (b) comprising co- and terpolymers of ethylene with propylene and/or a C$_4$-C$_8$ α-olefin, optionally containing minor amounts of a diene, the same disclosed for polymer (2)(a); and
4) amorphous polymers such as fluorinated polymers, polyvinyl difluoride (PVDF) for example.

In multi-layer pipes the layers of the pipe can have the same or different thickness.

By using the present polyolefin composition thinner pipes and fittings for buried sewage systems can be made by, e.g.,
utilizing pipe series S 13.3 instead of S11.2 to reach ring stiffness equal to or higher than 8 kN/m$^2$. The S-series and the corresponding wall thickness are described in the EN 1852/A1 rule.

The following examples are given to illustrate but not limit the present invention.

The following analytical methods are used to determine the extractability of the electron-donor compound and characterise the polymer compositions and the pipes obtained therefrom.

Melt Flow Rate: According to ISO method 1133 (5 kg, 230° C., unless specified).

[η] intrinsic viscosity: Determined in tetrahydronaphtalene at 135° C.

Ethylene content: Determined by I.R. Spectroscopy.

Fractions soluble and insoluble in xylene at 25° C.: 2.5 g of polymer are dissolved in 250 ml of xylene at 135° C. under agitation. After 20 minutes the solution is allowed to cool to 25° C., still under agitation, and then allowed to settle for 30 minutes. The precipitate is filtered with filter paper, the solution evaporated in nitrogen flow, and the residue dried under vacuum at 80° C. until constant weight is reached. Thus one calculates the percent by weight of polymer soluble and insoluble in xylene at ambient temperature.

Polidispersity Index (PI): measurement of molecular weight distribution in the polymer. To determine the PI value, the modulus separation at low modulus value, e.g. 500 Pa, is determined at a temperature of 200° C. by using a RMS-800 parallel plates rheometer model marketed by Rheometrics (USA), operating at an oscillation frequency which increases from 0.01 rad/second to 100 rad/second. From the modulus separation value, the PI can be derived using the following equation:

$$PI=54.6\times(\text{modulus separation})^{-1.76}$$

wherein the modulus separation (MS) is defined as:

$$MS=(\text{frequency at } G'=500 \text{ Pa})/(\text{frequency at } G''=500 \text{ Pa})$$

wherein G' is the storage modulus and G" is the low modulus.

Flexural elastic modulus: According to ISO method 178.

Elongation at yield: According to ISO/R method 527.

Tensile stress at yield and modulus of elasticity in tension (or tension modulus): According to ISO method 527.

IZOD impact resistance, notched: According to ISO method 180/1A.

Ring stiffness: According to ISO method 9969 at 23° C.

Modulus of elasticity in tension of the pipe (ME): calculated by the following formula in German method AT 127:

$$ME=SN\times12\times8\times t^{-3}\times[(d_{ex}-t)/2]^3,$$

where SN is the ring stiffness, d$_{ex}$ is the external diameter of the pipe and t is the pipe wall thickness.

EXAMPLE 1

Preparation of the Solid Catalyst Component 28.4 g of anhydrous MgCl$_2$ and 49.5 g of anhydrous ethanol, 100 ml of vaseline oil ROL OB/30 and 100 ml of silicone oil (viscosity: 350 mm²/s) are introduced, under an inert atmosphere, into a flask immersed in a heat stabilized bath at 120° C. and under stirring until the MgCl$_2$ is completely dissolved. Thereby there is formed the MgCl$_2$ adduct with ethanol in admixture with the oils. The hot mixture is then transferred, still under an inert atmosphere, to a 1,500 ml vessel provided with a heating jacket, and containing 150 ml of vaseline oil and 150 ml of silicone oil. This mixture is maintained at 120° C. and kept under stirring. The mixture is stirred for 3 minutes at 3,000 rpm. Thereupon, the mixture is discharged into a 2 liter vessel containing 1,000 ml of anhydrous n-heptane which is kept under stirring and cooled so that the final temperature does not exceed 0° C.

The MgCl$_2$.3C$_2$H$_5$OH microspheres thus obtained are partially dealcohlated. The alcohol is removed from the adduct at temperatures that gradually increase from 50 to 100° C. in nitrogen current until the alcohol is reduced to 1.8 moles per mole of MgCl$_2$. Then, the adduct is filtered, dried under vacuum at room temperature and activated as described in example 1 of U.S. Pat. No. 4,399,054.

Such microspheres yield a solid catalytic component containing 1.95% by weight of Ti.

Into a 500 ml four-necked round flask, purged with nitrogen, 250 ml of TiCl$_4$ are introduced at 0° C. While stirring, 10.0 g of above microspheroidal MgCl$_2$.1.8 C$_2$H$_5$OH are introduced. Then, a blend of both the racemic form and meso form of diethyl 2,3-(diisopropyl)succinate (DIEDIPS) as internal donor is added.

The temperature is raised to 110° C. and maintained for 60 minutes. Then, the stirring is discontinued, the solid product is allowed to settle and the supernatant liquid is siphoned off.

250 ml of fresh TiCl$_4$ are added. The mixture is reacted at 120° C. for 30 minutes and, then, the supernatant liquid is siphoned off.

Then, the stirring is discontinued, the solid product is allowed to settle and the supernatant liquid is siphoned off.

250 ml of fresh TiCl$_4$ are added again. The mixture is reacted at 120° C. for 30 minutes and, then, the supernatant liquid is siphoned off.

The solid is washed six times with anhydrous hexane (100 ml each time) at 60° C.

The internal donor content in the solid catalyst component is 11.1 wt %.

Polymerisation

The polymer compositions are prepared by polymerising propylene and ethylene under continuous conditions in a plant comprising a gas phase polymerisation apparatus.

The above-disclosed catalyst component is used with dicyclopentyldimethoxysilane (DCPMS) as external electron-donor component and with triethylaluminium (TEAL). The weight ratio TEAL/catalyst component is 5; the weight ratio TEAL/DCPMS is 4. The catalyst is sent to the gas phase polymerisation apparatus. The latter comprised two interconnected cylindrical reactors, riser 1 and downcomer 2. Fast fluidisation conditions are established in reactor 1 by recycling gas from the gas-solid separator.

The way to differentiate the gas composition in the two reactor legs is the "barrier" feed. This stream is propylene fed in the larger upper part of the downcomer.

Other operative conditions and the characteristics of the produced polymers are indicated in Table I.

At the end of the polymerisation, the resulting polymer powder is discharged, stabilised with a conventional stabiliser packaging, dried in an oven in a nitrogen stream at 60° C., and then introduced along with talc in amount of 2 wt % with respect to the polymer moiety in a Werner 53 extruder for granulation.

In Table II the properties of polymer compositions determined on the granulated compositions are reported.

Pipe ring stiffness, according to ISO 9969, and a calculation value for elasticity modulus at a nominal diameter of 110.24 mm and wall thickness of 3.2 mm are determined and calculated and the results are indicated in Table II.

TABLE I

|  | Example 1 |
|---|---|
| Temperature, ° C. | 80 |
| 1$^{st}$ Component - Propylene Homopolymer | |
| Spilt[1], wt % | 92 |
| MFR (230° C., 5 kg), g/10 min | 1.6 |
| Polydispersity Index | 6.2 |
| Soluble fraction in xylene at 25° C., wt % | 1.6 |
| [η] ([η]$_1$), dl/g | 3.2 |
| 2$^{nd}$ Component - Propylene-ethylene copolymer rubber | |
| Temperature (fluid bed reactor), ° C. | 70 |
| C$_2^-$/(C$_2^-$ + C$_3^-$), mol/mol | 0.28 |
| Split[1], wt % | 8 |
| Ethylene content, wt % | 42 |
| Soluble fraction in xylene at 25° C., wt % | 91 |
| [η] of the soluble fraction in xylene at 25° C. ([η]$_2$), dl/g | 3.6 |
| Whole Polymer Composition | |
| Ethylene content, wt % | 3.3 |
| Soluble fraction in xylene at 25° C., wt % | 8.3 |
| [η]$_1$/[η]$_2$ ratio | 0.86 |

[1]Amount of polymer prepared in the concerned reactor, referred to the total polymer weight.
Notes:
C$_2^-$: ethylene;
C$_3^-$: propylene.

TABLE II

|  | Example 1 |
|---|---|
| Properties of the composition after 7 days | |
| MFR (230° C., 5 kg), g/10 min | 1.19 |
| Flexural modulus, MPa | 1886 |
| Izod impact resistance at 0° C., kJ/m² | 22.8 |
| Izod impact resistance at −20° C., kJ/m² | 9.9 |
| Tensile stress at yield, MPa | 33.9 |
| Modulus of elasticity in tension, MPa | 1811 |
| Properties relating to the pipe | |
| Ring stiffness, kN/m² | 4.94 |
| Modulus of elasticity in tension, MPa | 2219 |

EXAMPLE 2

Preparation of the First Solid Catalytic Component 48 g of anhydrous MgCl$_2$, 77 g of anhydrous C$_2$H$_5$OH, and 830 ml of kerosene are fed, in inert gas and at ambient temperature, in a 2 liter autoclave equipped with a turbine agitator and drawing pipe. The content is heated to 120° C. while stirring thus forming the adduct between MgCl$_2$ and the alcohol that melts and remains mixed with the dispersing agent. The nitrogen pressure inside the autoclave is maintained at 1.5 MPa. The drawing pipe of the autoclave is heated externally to 120° C. with a heating jacket, has an inside diameter of 1 mm, and is 3 meters long from one end of the heating jacket to the other. Then the mixture is caused to flow through the pipe at a velocity of about 7 m/sec.

At the exit of the pipe the dispersion is gathered in a 5 l flask, under agitation, containing 2.5 l of kerosene, and being externally cooled by way of a jacket maintained at an initial temperature of −40° C.

The final temperature of the dispersion is 0° C.

The spherical solid product that constituted the dispersed phase of the emulsion is separated by way of settling and filtration, and then washed with heptane and dried. All said operations are carried out in an inert gas atmosphere.

130 g of $MgCl_2 \cdot 3C_2H_5OH$ in the form of spherical solid particles with a maximum diameter less than or equal to 50 micron, are obtained. Then, the $MgCl_2 \cdot 3C_2H_5OH$ microspheres thus obtained, are partially dealcohlated as described in example 1 to obtain $MgCl_2 \cdot 1.1C_2H_5OH$.

In a 500 ml cylindrical glass reactor equipped with a filtering barrier are introduced at 0° C. 225 ml of $TiCl_4$ and, while under agitation in a period of 15 minutes, 10.1 g (54 millimoles) of microspheroidal $MgCl_2 \cdot 2.1C_2H_5OH$ obtained as described above.

At the end of the addition, the temperature is brought to 40° C. and diisobutyl phthalate is introduced.

The temperature is increased to 100° C. in the course of 1 hour, and the stirring continues for an additional 2 hours. The $TiCl_4$ is then removed by filtration, 200 ml of $TiCl_4$ are added while continuing the stirring at 120° C. for one more hour. Finally, the content is filtered and washed at 60° C. with n-heptane until all chlorine ions disappear from the filtrate. The catalyst component obtained in this manner contains 3.3% by weight of Ti and 10.8% by weight of diisobutyl phthalate.

Preparation of the Second Solid Catalytic Component

The second catalyst is prepared as the first solid catalyst component except that microspheroidal $MgCl_2 \cdot 2.4C_2H_5OH$ is obtained and the catalyst component contains 17.4% by weight of diisobutyl phthalate.

Catalyst System and Prepolymerisation Treatment

Before introducing it into the polymerisation reactors, a mixture of the solid catalyst components described above in the weight ratio of 1 to 1 is contacted at 12° C. for 24 minutes with triethylaluminium and dicyclopentyldimethoxysilane (DCPMS) in such quantity that the weight ratio of TEAL to the solid catalyst component be equal to 11 and the weight ratio of TEAL and DCPMS is 5.45.

The catalyst system is then subjected to prepolymerisation by maintaining it in suspension in liquid propylene at 20° C. for about 5 minutes before introducing it into the first polymerisation reactor.

Polymerisation

The polymerisation run is conducted in continuous mode in a series of three reactors equipped with devices to transfer the product from one reactor to the one immediately next to it. The first two reactors are liquid phase reactors, and the third is a fluid bed gas phase reactor. Component (1) is prepared in the first and second reactor, while component (2) is prepared in the third.

Hydrogen is used as molecular weight regulator.

The gas phase (propylene, ethylene and hydrogen) is continuously analysed via gas-chromatography.

At the end of the run the powder is discharged and dried under a nitrogen flow.

Then, in a Cortiplast extruder the polymer composition powder thus obtained is mixed, molten and granulated with talc in amounts of 2 wt % with respect to the polymer moiety and a conventional stabiliser packaging In the extruder the temperature of the melt polymer composition is 230° C. and the die pressure is 19-20 MPa.

The main polymerisation conditions and the analytical data relating to the polymers produced in the three reactors are reported in Table III.

The features and the mechanical and physical properties of the polymer compositions of example 2 and the pipe prepared therefrom are reported in Table IV.

Pipe ring stiffness, according to ISO 9969, and a calculation value for modulus of elasticity in tension at a nominal diameter of 250 mm and wall thickness of 10.7 mm are determined and calculated and the results are indicated in Table IV.

COMPARATIVE EXAMPLE 1

A copolymer of propylene contains about 4.5 wt % of ethylene and has a value of [η] of 3.58 dl/g, a value of MFR (230° C., 2.16 kg) of 0.29 g/10 min (corresponding to 0.3 g/10 min at 230° C. and 5 kg) and is insoluble in xylene at ambient temperature in an amount of 89.1%.

Said conventional, commercial propylene copolymer corresponding to the present sate of art in the field of rigid pipes is extruded in a Cortiplast extruder as in example 3. In the extruder the temperature is 227° C. and the die pressure is 21 MPa.

The higher value of pressure in the die extruder shows that processability of the conventional polymer is lower than that of the composition according to the present invention, the MFR values being similar.

TABLE III

|  | Example 2 |
|---|---|
| 1$^{st}$ Reactor - Homopolypropylene | |
| Temperature, ° C. | 72 |
| Pressure, bar | 42 |
| Slurry density, kg/m$^3$ | 508 |
| H$_2$ Bulk[1], ppm | 304 |
| Split[2], wt % | 56 |
| MFR (10 kg, 230° C.), g/10 min | 0.24 |
| 2$^{nd}$ Reactor - Homopolypropylene | |
| Temperature, ° C. | 70 |
| Pressure, bar | 42 |
| Slurry density, kg/m$^3$ | 528 |
| H$_2$ bulk[1], ppm | 918 |
| Split[2], wt % | 34 |
| MFR (5 kg, 230° C.), g/10 min | 0.68 |
| Insoluble fraction in xylene at 25° C.[3], wt % | 98.6 |
| Polydispersity Index[3] | 6.7 |
| [η][3] ([η]$_1$), dl/g | 3.6 |
| 3$^{rd}$ Reactor - Propylene-ethylene copolymer rubber | |
| Temperature, ° C. | 75 |
| Pressure, bar | 17 |
| H$_2$/C$_2^-$, molar ratio | 0.032 |
| C$_2^-$/(C$_2^-$ + C$_3^-$), mol/mol | 0.35 |
| Split[2], wt % | 10 |
| Ethylene content, wt % | 46 |
| [η] of the soluble fraction in xylene at 25° C. ([η]$_2$), dl/g | 33 |

TABLE III-continued

| | Example 2 |
|---|---|
| Whole Polymer Composition | |
| MFR, g/10 min | 0.81 |
| Ethylene content, wt % | 4.7 |
| Soluble fraction in xylene at 25° C., wt % | 10.1 |
| [η]$_1$/[η]$_2$ ratio | 1.09 |

[1] Hydrogen concentration in the liquid monomer;
[2] Amount of polymer prepared in the concerned reactor, referred to the total polymer weight;
[3] Referred to the total polymer produced in the first two reactors.
Notes:
C$_2^=$: ethylene;
C$_3^=$: propylene.

TABLE IV

| | Example 2 |
|---|---|
| Polymer properties after 7 days | |
| Flexural modulus, MPa | 1755 |
| Izod impact resistance at 0° C., kJ/m$^2$ | NB[1] |
| Izod impact resistance at −10° C., kJ/m$^2$ | 11.2 |
| Izod impact resistance at −20° C., kJ/m$^2$ | 6.1 |
| Tensile stress at yield, MPa | 33 |
| Properties relating to the pipe | |
| Ring stiffness, kN/m$^2$ | 16 |
| Modulus of elasticity in tension; MPa | 2148 |

[1] Not Broken.

Examples 1 and 2 show that the pipes according to the present invention possess values of modulus of elasticity in tension higher than 2000 MPa, contrary to those of prior art pipes.

The invention claimed is:

1. Articles prepared by extrusion, moulding and combinations thereof, comprising a heterophasic polyolefin composition comprising (percent by weight):
   (1) 65-95% of a crystalline propylene homopolymer, said crystalline propylene homopolymer being insoluble in xylene at ambient temperature in an amount over 85% and having a polydispersity index ranging from 4 to 13 and an intrinsic viscosity ([η]) value of over 2.2 dl/g; and
   (2) 5-35% of an elastomeric olefin polymer of ethylene with a $C_3$-$C_{10}$ α-olefin and optionally a diene, having an ethylene content ranging from 15 to 85% and an intrinsic viscosity ([η]) value of at least 1.4 g/ml;
   wherein a ratio of the intrinsic viscosity value of the crystalline propylene homopolymer (1) to that of elastomeric olefin polymer (2) ranges from 0.45 to 1.6.

2. The articles of claim 1 wherein the crystalline propylene homopolymer has a polydispersity index from 4.5 to 12.

3. The articles of claim 1 having a modulus of elasticity in tension higher than 2000 MPa.

4. Mono- or multi-layer pipes wherein at least one layer comprises a composition comprising:
   (1) 65-95% of a crystalline propylene homopolymer, said crystalline propylene homopolymer being insoluble in xylene at ambient temperature in an amount over 85% and having a polydispersity index ranging from 4 to 13 and an intrinsic viscosity ([η]) value of over 2.2 dl/g; and
   (2) 5-35% of an elastomeric olefin polymer of ethylene with a $C_3$-$C_{10}$ α-olefin and optionally a diene, having an ethylene content ranging from 15 to 85% and an intrinsic viscosity ([η]) value of at least 1.4 g/ml;
   wherein a ratio of an intrinsic viscosity value of the crystalline propylene homopolymer (1) to that of elastomeric olefin polymer (2) ranges from 0.45 to 1.6.

5. The mono- or multi-layer pipes according to claim 4, wherein the pipes are solid wall pipes with a pipe wall thickness and smooth inner and outer surfaces, with an external diameter of ≧20 mm to ≦2000 mm, and have values of ring stiffness (SN) satisfying the following mathematical relationship $$270 \text{ kN/m}^2 \times [10/(SDR-1)]^3 \geqq SN \geqq 130 \text{ kN/m}^2 \times [10/(SDR-1)]^3,$$

where SDR represents a ratio of the external diameter to the pipe wall thickness.

6. The mono- or multi-layer pipes according to claim 4, in which the pipe is a waste water pipe, a underground drain pipe or a buried sewage pipe.

7. A heterophasic polyolefin composition having a melt flow rate value up to 2 g/10 min and comprising (percent by weight):
   (1) 65-95% of a crystalline propylene homopolymer, said crystalline propylene homopolymer being insoluble in xylene at ambient temperature in a percentage over 85% and having a polydispersity index ranging from 4 to 13 and an intrinsic viscosity ([η]) value of over 2.2 dl/g; and
   (2) 5-35% of an elastomeric olefin polymer of ethylene with a $C_3$-$C_{10}$ α-olefin and optionally a diene, having an ethylene content ranging from 15 to 85%, and having an intrinsic viscosity ([η]) value of at least 1.4 g/ml;
   wherein a ratio of the intrinsic viscosity value of crystalline propylene homopolymer (1) to that of elastomeric olefin polymer (2) ranges from 0.45 to 1.6.

8. The composition of claim 7 wherein the crystalline propylene homopolymer has a polydispersity index from 4.5 to 12.

9. A process comprising: extruding, moulding, or extruding and molding a composition comprising:
   (1) 65-95% of a crystalline propylene homopolymer, said crystalline propylene homopolymer being insoluble in xylene at ambient temperature in an amount over 85% and having a polydispersity index ranging from 4 to 13 and an intrinsic viscosity ([η]) value of over 2.2 dl/g; and
   (2) 5-35% of an elastomeric olefin polymer of ethylene with a $C_3$-$C_{10}$ α-olefin and optionally a diene, having an ethylene content ranging from 15 to 85% and an intrinsic viscosity ([η]) value of at least 1.4 g/ml;
   wherein a ratio of the intrinsic viscosity value of the crystalline propylene homopolymer (1) to that of elastomeric olefin polymer (2) ranges from 0.45 to 1.6.

10. Extruded profiles, films and sheets made from compositions comprising:
    (1) 65-95% of a crystalline propylene homopolymer, said crystalline propylene homopolymer being insoluble in xylene at ambient temperature in an amount over 85% and having a polydispersity index ranging from 4 to 13 and an intrinsic viscosity ([η]) value of over 2.2 dl/g; and
    (2) 5-35% of an elastomeric olefin polymer of ethylene with a $C_3$-$C_{10}$ α-olefin and optionally a diene, having an ethylene content ranging from 15 to 85% and an intrinsic viscosity ([η]) value of at least 1.4 g/ml;
    wherein a ratio of the intrinsic viscosity value of the crystalline propylene homopolymer (1) to that of elastomeric olefin polymer (2) ranges from 0.45 to 1.6.

* * * * *